US009059902B2

(12) United States Patent
Singal et al.

(10) Patent No.: US 9,059,902 B2
(45) Date of Patent: Jun. 16, 2015

(54) PROCEDURES, APPARATUSES, SYSTEMS, AND COMPUTER-READABLE MEDIA FOR OPERATING PRIMARY AND BACKUP NETWORK ELEMENTS

(75) Inventors: Pawan K. Singal, Sunnyvale, CA (US); Sasha Cirkovic, San Francisco, CA (US); Chirayu Shah, Fremont, CA (US)

(73) Assignee: CORIANT OPERATIONS, INC, Naperville, IL (US)

( * ) Notice: Subject to any disclaimer, the term of this patent is extended or adjusted under 35 U.S.C. 154(b) by 40 days.

(21) Appl. No.: 13/594,156

(22) Filed: Aug. 24, 2012

(65) Prior Publication Data

US 2014/0056122 A1 Feb. 27, 2014

(51) Int. Cl.
*H04L 12/24* (2006.01)
*H04L 12/703* (2013.01)

(52) U.S. Cl.
CPC ............ *H04L 41/0668* (2013.01); *H04L 45/28* (2013.01)

(58) Field of Classification Search
CPC ............................ H04L 12/24; H04L 41/0668
USPC ......... 370/217, 218, 220, 222, 225, 242, 392, 370/395.53; 398/45
See application file for complete search history.

(56) References Cited

U.S. PATENT DOCUMENTS 6,751,191 B1 * 6/2004 Kanekar et al. ............... 370/217
7,843,814 B2 11/2010 McConnochie et al.
8,792,501 B1 * 7/2014 Rustagi et al. ........... 370/395.53
2002/0159392 A1 * 10/2002 Klipper et al. ................ 370/242
2007/0076719 A1 * 4/2007 Allan et al. .................. 370/392
2009/0024722 A1 1/2009 Sethuraman et al.
2009/0028561 A1 * 1/2009 Zhang et al. .................... 398/45
2009/0161535 A1 6/2009 Saha
2010/0020680 A1 * 1/2010 Salam et al. ................. 370/225
2010/0315946 A1 * 12/2010 Salam et al. ................. 370/222
2011/0305136 A1 * 12/2011 Pan et al. ...................... 370/218
2012/0195189 A1 * 8/2012 Wang et al. .................. 370/225
2012/0239966 A1 9/2012 Kompella et al.
2012/0314597 A1 12/2012 Singh et al.
2012/0315906 A1 12/2012 Stephens
2012/0324086 A1 12/2012 Brzozowski

FOREIGN PATENT DOCUMENTS

EP 1026918 B1 10/2004
EP 1671440 B1 2/2010

OTHER PUBLICATIONS

U.S. Appl. No. 13/544,723, filed Jul. 9, 2012.

* cited by examiner

*Primary Examiner* — Brian D Nguyen
*Assistant Examiner* — Toan Nguyen
(74) *Attorney, Agent, or Firm* — Fitzpatrick, Cella, Harper & Scinto

(57) ABSTRACT

Procedures, apparatuses, systems, and computer-readable media for operating primary and backup network elements (NEs). The procedure for operating the primary NE includes determining a failure in a primary path in which the primary NE is interposed. A switch-over notification message is provided via an inter-chassis communication link to a backup NE. At least one status synchronization message is communicated with at least one of the backup NE via the inter-chassis communication link and a head-end NE in accordance with a standardized protection switching protocol. The procedure for operating the backup NE includes receiving the switch-over notification message, indicating failure in a primary path, via the inter-chassis communication link. A status synchronization message is provided in accordance with the standardized protection switching protocol to a head-end NE to establish communication with the head-end NE via a secondary path.

10 Claims, 10 Drawing Sheets

100
120
124
112
128
102
Cell Site
126
116
103
Cell Site
148
104
142
144
150
146
152
106
118
108
130
132
RNC 110
170

PROCEDURES, APPARATUSES, SYSTEMS, AND COMPUTER-READABLE MEDIA FOR OPERATING PRIMARY AND BACKUP NETWORK ELEMENTS

FIELD

Example aspects described herein relate generally to communications networks, and, in particular, to procedures, apparatuses, systems, and computer-readable media for operating primary and backup network elements in a dual homing network configuration.

BACKGROUND

A high-speed network environment typically includes network devices such as access switches, routers, and bridges used to facilitate delivery of information packets and/or data traffic from source devices to destination devices. Information pertaining to the transfer of packet(s) through the network is usually embedded within the packet itself. Each packet traveling through one or more communications networks such as Internet and/or Ethernet can typically be handled independently from other packets in a packet stream or traffic. For example, each router which may include routing, switching, and/or bridging, engines processes incoming packets and determines where the packet(s) should be forwarded.

In a high-speed computing network environment, maintaining high speed traffic flows with minimal data loss and/or packet drop is desired. As such, it is also desirable to detect failures relating to data links and/or connections between the network devices, thereby allowing for traffic flows to be maintained and rerouted so as to reduce packet drop(s).

SUMMARY

One cause of data (or packet) loss in high-speed networks is the continued sending of data packets to a router over a data link after the data link is already closed (or down).

A conventional approach is to use Rapid Spanning Tree Protocol ("RSTP") or Spanning Tree Protocol ("STP") to reduce looping and black-holing of data traffic. However, a drawback associated with RSTP is slow response time. For example, RSTP could typically take a few seconds to respond to a scenario of remote link failure. Packets or data streams may be lost if a network device is unable to respond to a link failure in a reasonable span of specified time.

In view of the foregoing, procedures, apparatuses, systems, and computer-readable media for operating primary and backup network elements (NEs) are provided.

In one example embodiment herein, the procedure for operating the primary NE includes determining a failure in a primary path in which the primary NE is interposed. The primary NE provides a switch-over notification message via an inter-chassis communication link to a backup NE. The primary NE communicates at least one status synchronization message with at least one of the backup NE via the inter-chassis communication link and a head-end NE in accordance with a standardized protection switching protocol.

In an example embodiment herein, the standardized protection switching protocol is a standardized Ethernet protection switching protocol and the paths are logical Virtual Local Area Network (VLAN) paths of a Virtual Private Local Area Network Service (VPLS) network.

In a further example embodiment herein, the standardized Ethernet protection switching protocol is the G.8031 Ethernet Protection Switching protocol under International Telecommunication Union ("ITU") standard for failover, and communication via the inter-chassis communication link is performed in accordance with the Internet Engineering Task Force (IETF) Inter-Chassis Communication Protocol (ICCP).

In a further example embodiment herein, the communication via the inter-chassis communication link in accordance with ICCP includes communication of at least one of configuration information, network information, and information in G.8031 messages.

In another example embodiment herein, in response to a recovery status synchronization message indicating that the primary path has recovered, the primary NE provides at least one of a media access control ("MAC") flush message and a status synchronization message indicating that the primary NE is enabled.

In an example embodiment herein, the determination of the failure in the primary path is performed based on at least one of detection of the failure via a connectivity verification protocol, reception of a connection defect message, and detection of a failure at a physical layer.

In one example embodiment herein, the procedure for operating the backup NE includes receiving the switch-over notification message, indicating failure in a primary path, via the inter-chassis communication link. The backup NE provides a status synchronization message in accordance with the standardized protection switching protocol to a head-end NE to establish communication with the head-end NE via the secondary path.

In an example embodiment herein, the standardized protection switching protocol is a standardized Ethernet protection switching protocol and the paths are logical Virtual Local Area Network (VLAN) links of a Virtual Private Local Area Network Service (VPLS) network.

In a further example embodiment herein, the standardized Ethernet protection switching protocol is the G.8031 Ethernet Protection Switching protocol under International Telecommunication Union ("ITU") standard for failover, and communication via the inter-chassis communication link is performed in accordance with the Internet Engineering Task Force (IETF) Inter-Chassis Communication Protocol (ICCP).

In a further example embodiment herein, the communication via the inter-chassis communication link in accordance with ICCP includes communication of at least one of configuration information, network information, and information in G.8031 messages.

In a further example embodiment herein, information, received from the primary NE via the inter-chassis communication link, is provided to the head-end NE in at least one G.8031 message, and information in G.8031 messages received from the head-end NE is provided to the primary NE via the inter-chassis communication link.

In another example embodiment herein, in response to receipt of the switch-over notification message, at least one of a media access control ("MAC") flush message and a status synchronization message indicating that the backup NE is enabled is provided.

In an example embodiment herein, in response to reception of a recovery status synchronization message indicating that a primary path has recovered, the backup NE forwards the recovery status synchronization message to a primary NE. In response to reception of a further status synchronization message from the primary NE indicating that the primary NE is enabled, the backup NE forwards the further status synchronization message to the head-end NE.

In a further example embodiment herein, the primary path is enabled in accordance with the standardized protection switching protocol.

Additional features and benefits of the exemplary embodiments will become apparent from the detailed description, figures and claims set forth below.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, wherein:

DETAILED DESCRIPTION

Reference will now be made in detail to implementations of the exemplary embodiments as illustrated in the accompanying drawings. The same reference indicators will be used throughout the drawings and the following detailed description to refer to the same or like parts.

An IP communication network, IP network, or communication network may be, in some examples, any type of network having an access network able to transmit data in the form of packets or cells, for example of ATM (Asynchronous Transfer Mode) type, on a transport medium, for example, the TCP/IP or UDP/IP type. ATM cells are the result of decomposition (or segmentation) of packets of data, for example, IP type, and those packets (here IP packets) comprise an IP header, a header specific to the transport medium (for example UDP or TCP) and payload data. The IP network may also include a satellite network, for example a DVBRCS (Digital Video Broadcasting-Return Channel System) network, providing Internet access via satellite, or an SDMB (Satellite Digital Multimedia Broadcast) network, or a terrestrial network, for example a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Of course, these are merely examples only, and the IP communication network, IP network, or communication network are not limited only thereto.

Figure 1:
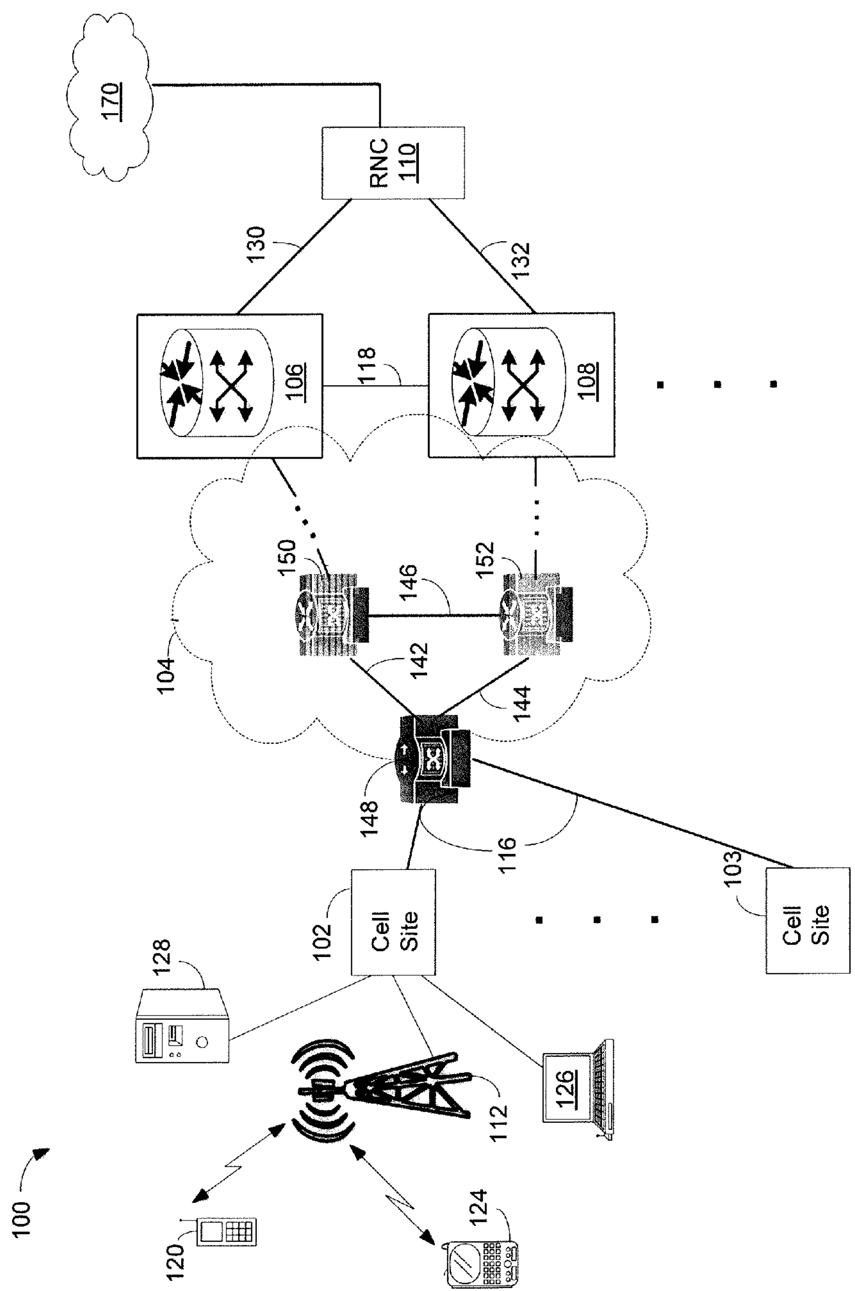
FIG. 1 is a block diagram illustrating a computer network having a primary router and backup router organized in a dual homing configuration in accordance with an example embodiment herein.

FIG. 1 is a block diagram illustrating a computer network 100 having a primary router and backup router organized in a dual homing configuration in accordance with an example embodiment herein. Network 100 includes multiple cell sites 102 and 103, a switching network 104, multiple routers 150, 152, 106 and 108 (described below), and a Radio Network Controller ("RNC") 110. RNC 110 is further coupled with a Wide Area Network ("WAN") and/or Internet 170. Depending on applicable design criteria, RNC 110 may be coupled with other RNC (not shown) to enhance network management and capacities. In an alternative configuration, RNC 110 may be replaced with other network element(s) such as gateway(s) and router(s). It should be noted that the underlying concept of the exemplary embodiments would not change if one or more additional ones of the above components (or elements) were added to or removed from network 100.

Switching network 104 includes an access switch ("AS") 148, a primary router 150, and a backup router 152 wherein AS 148 and routers 150 and 152 are configured to form a dual homed or dual homing redundancy network configuration. AS 148 is located at the edge or outside (or inside) of switching network 104, and is coupled to one or more cell sites 102-103 via connections 116. Switching network 104 may include network elements ("NEs") and/or a network management system ("NMS") depending on applicable design criteria, although none are shown in FIG. 1. Routers 106 and 108, in the example embodiment of FIG. 1, may be, for example, edge routers and/or routers inside of switching network 104. Switching network 104, in one example, may be an IP and/or Multi Protocol Label Switching ("MPLS") based circuit network which may operate at a layer of Open Systems Interconnection Basic Reference Model ("OSI model"). Network 104 may further include a circuit switch block and a backhaul block for transferring information and/or various data traffic to and from network clients, although none are shown in FIG. 1.

Switching network 104, in one example embodiment, includes a virtual network such as Virtual Private LAN Service ("VPLS") and virtual local area network ("VLAN"). VPLS provides Ethernet based multipoint to multipoint communication over the IP/MPLS network. VPLS is also able to use pseudo-wires ("PW") to connect multiple geographically separated hosts and/or nodes and allows the dispersed nodes to share the same or similar Ethernet broadcast domain. VLAN, on the other hand, is a logical LAN or multiple LANs grouping multiple hosts allowing hosts to communicate using the same broadcast domain. A VLAN uses the similar requirements and/or attributes as a physical LAN and links multiple hosts or devices together even if they are not located on the same network switch. It should be noted that various protocols, such as interior border gateway protocol ("iBGP"), MPLS, OSPF, and RSVP (resource reservation protocol), may be used as Layer 2 (L2) VPN (virtual private network) related applications.

In one example embodiment herein, AS 148 is a managed edge system and/or management system capable of managing a network, connections, ports, or switching services. For example, AS 148 provides access to service providers' networks at traffic aggregation points or cell sites. AS 148 is useful because it may provide a more scalable network solution between customer equipment ("CE") and provider edge ("PE") routers for data transfer. AS 148, in one example, is capable of performing both access switching functions and router functions.

A router, for example, is a network element or network device capable of forwarding data packets across one or more communication networks in accordance with its routing mechanism such as a routing table. A router may be, for example, a microprocessor-controlled computing system which may be coupled to two or more data lines configured to direct data traffic through one or more communication networks. A network element or network client, in one example, can include one or more routers, hubs, switches, hosts, base stations, and the like. A NMS, in one example aspect, is a computer system or server including hardware and/or software used to monitor and control the network including various network elements. Network 100, for example, includes routers 106 and 108 which are capable of routing information between cell sites 102-103 and RNC 110 via switching network 104.

A dual homed redundancy host, network or gateway is, for example, situated between two interfaces to enhance data integrity or prevent data drop. Dual homed redundancy, also known as dual homing, provides two independent data paths (e.g., primary link 142 and secondary link 144) for each dual-attached device (e.g., AS 148). In the example embodiment of FIG. 1, primary link 142 and secondary link 144 are logical Virtual Local Area Network (VLAN) links of a Virtual Private Local Area Network Service (VPLS) network. In other embodiments, the primary link and the secondary link are logical links that are configured to support one or more of network services such as point-to-point, point-to-multipoint (bridging), multipoint-to-multipoint (IP) services, and the like, and/or that are configured to support applications, such as, for example, VLAN, IPTV, VoD, video conferencing, real time data, stock transactions, and the like.

In the example embodiment of FIG. 1, AS 148 is structured in a dual homed redundancy configuration wherein a primary link (or path) 142 is used to connect AS 148 to primary router 150 and a secondary link (or path) 144 is used to connect AS 148 to a backup router 152. Under normal conditions, AS 148 transmits data packets to and from primary router 150 via primary link 142. In the event that link 142 or primary router 150 fails, AS 148 switches its connection from primary router 150 to backup router 152 whereby AS 148 can continue network services via a backup route. When primary router 150 recovers from an earlier crash or failure, AS 148, in the example embodiment, switches back (or reverts) from backup router 152 to primary router 150.

Routers 106 and 108, for example, are interconnected by Interior Gateway Protocol ("IGP") 118 for redundancy purposes. Each router, for example, can perform functions of IP routing. Connections 130 and 132 are used to couple RNC 110 with routers 106 and 108 wherein connections 130 and 132 can be land line connections, wireless connections, or a combination of wired and wireless connections.

In the example embodiment of FIG. 1, primary router 150 and backup router 152, for example, are interconnected by an inter-chassis communication link 146. In the example embodiment, the inter-chassis communication link 146 is a tunneled LDP (label distribution protocol) LSP (label switched path). In other embodiments, the inter-chassis communication link 146 can be a link directly connecting primary router 150 and backup router 152.

The inter-chassis communication link 146 is configured to provide communication between routers 150 and 152 in accordance with an inter-chassis communication protocol. In the example embodiment, the inter-chassis communication link 146 is configured to exchange messages, such as, for example, control messages, notification messages, status messages, synchronization messages, messages in accordance with the standardized G.8031 Ethernet Protection Switching protocol under International Telecommunication Union ("ITU"), and the like.

In the example embodiment inter-chassis communication link 146 provides communication in accordance with the Internet Engineering Task Force (IETF) Inter-Chassis Communication Protocol (ICCP), draft-ietf-pwe3-iccp-07, available at http://tools.ietf.org/html/draft-ietf-pwe3-iccp-07, the contents of which are hereby incorporated by reference herein in their entirety, as if set forth fully herein.

The ICCP protocol specifies operations over Label Distribution Protocol (LDP) (as specified by IETF RFC 5036) that provide for the exchange of messages between primary router 150 and backup router 152.

In the example embodiment, primary router 150 provides at least one of the following to backup router 152, via the inter-chassis communication link 146 in accordance with ICCP: i) configuration information received by primary router 150, and ii) network information detected by primary router 150. Primary router 150 receives at least one of the following from backup router 152, via the inter-chassis communication link 146 in accordance with ICCP: i) configuration information received by backup router 152, ii) network information detected by backup router 152, and iii) information in G.8031 messages received by backup router 152 from AS 148.

Similarly, backup router 152 receives at least one of the following from primary router 150, via the inter-chassis communication link 146 in accordance with ICCP: i) configuration information received by primary router 150, and ii) network information detected by primary router 150. Backup router 152 provides information, received from primary router 150 via the inter-chassis communication link 146 in accordance with ICCP, to AS 148 in at least one G.8031 message. Backup router 152 also exchanges G.8031 messages with AS 148 via secondary link (or path) 144. Backup router 152 provides at least one of the following to primary router 150, via the inter-chassis communication link 146 in accordance with ICCP: i) configuration information received by backup router 152, network information detected by backup router 152, and information in G.8031 messages received by backup router 152 from AS 148. Configuration information may include, for example, information configured by a user.

Cell site 102, also known as a base station, includes a radio tower 112, a computer 126, and a server 128, wherein radio tower 112 provides wireless communication with a cellular phone 120 and a handheld device 124. Base station or cell site 102 is capable of communicating with mobile devices such as cellular phone 120 and handheld device 124 via radio tower 112. It should be noted that cell site 102 may include additional radio towers as well as other land switching circuitry, not shown in FIG. 1. The cell stations such as cell sites 102-103 can be configured to support wireless communications as well as wired communications.

Upon detecting a loss of continuity check ("CC") message in accordance with IEEE 802.1ag, AS 148, in the example embodiment of FIG. 1, commences an operation of failover. In other embodiments, any other suitable protocol for verifying connectivity of a logical and/or physical link (e.g., primary link 142 and secondary link 144) may be used instead of IEEE 802.1ag. The contents of the IEEE 802.1ag standard are incorporated by reference herein.

Upon setting remote defect indication ("RDI") to one (1), hereinafter referred to as RDI=1, AS 148 sends a CC message with RDI=1 to primary router 150. After receiving RDI=1, primary router 150 sends a switch-over notification message to the backup router 152 via the inter-chassis communication link 146 between the primary router 150 and the backup router 152. The switch-over notification message is a message for controlling the backup router 152 to establish communication with AS 148 via the secondary link 144 in the case of the failure of the primary link 142.

Meanwhile, AS 148 switches (or fails over) to protection path (or secondary link) 144 in accordance with a standardized Ethernet protection switching protocol that provides for switching from a primary (or working) link to a secondary (or protection) link. In more detail, the Ethernet protection switching protocol defines messages for controlling a switch-over from the primary link to the secondary link, and for synchronizing status between NE's at either end of the secondary link. In the example embodiment of FIG. 1, the standardized Ethernet protection switching protocol is the G.8031 Ethernet Protection Switching protocol under International Telecommunication Union ("ITU") standard for failover, "ITU-T Rec. G.8031/Y.1342 (June 2006) Ethernet Protection Switching", available at http://www.transanatolia.eu/analyses/Ethernet/T-REC-G.8031-200606-I!!PDF-E.pdf, the contents of which are hereby incorporated by reference herein in their entirety, as if set forth fully herein.

In response to reception of the switch-over notification message from primary router 150, backup router 152 sends a media access control ("MAC") flush message to other network elements (e.g., 106 and 108 of FIG. 1) to flush all MAC addresses for the VLAN not learned from the backup router 152, opens the backup router 152's communication port by setting transmitting port to one (1) (Tx=1), and sends a status synchronization request in accordance with the G.8031 standard to AS 148 to establish communication with AS 148 via the secondary link 144. The MAC flush message is sent in accordance with IETF RFC 4762 ("Virtual Private LAN Service (VPLS) Using Label Distribution Protocol (LDP) Signaling"), available at http://tools.ietf.org/html/rfc4762, the contents of which is hereby incorporated by reference herein in its entirety, as if set forth fully herein.

For operation relating to reversion, after backup router 152 is activated for routing services, primary router 150 begins a recovery process to restore (or resume) itself from inactive status to active status. Once primary router 150 is restored and is able to resume network service, primary router 150 reestablishes label-switched path ("LSP") using RSVP (Resource Reservation Protocol) via connection 142 between router 150 and AS 148. When AS 148 detects 802.1ag CC from router 150, AS 148 sends a 802.1ag CC message with reset of RDI (RDI=0) to primary router 150. Primary router 150 clears RDI condition(s) after it receives RDI=0 from AS 148. Upon commencement of a revert-timer, AS 148 notifies the backup router 152 that the revert timer is ticking (or counting) and that the backup link 144 will continue to be used until the revert-timer expires. When the revert-timer expires, AS 148 switches back to G.8031 working path, primary link 142, and instructs backup router 152 to close its communication port (Tx=0) by sending a recovery status synchronization message in accordance with the G.8031 standard. Backup router 152 subsequently closes its communication port (Tx=0) and forwards the recovery status synchronization message to the primary router 150.

In response to reception of a recovery status synchronization message forwarded by the backup router 152 from AS 148, and indicating that the primary link 142 has recovered, the primary router 150 sends a media access control ("MAC") flush message to other network elements (e.g., 106 and 108 of FIG. 1) to flush all MAC addresses for the VLAN not learned from the primary router 150, and sends the backup router 152 a status synchronization message indicating that the primary router 150 is enabled for communication with AS 148. Backup router 152 forwards the status synchronization message sent from the primary router 150 to AS 148.

A redundant dual homing networking solution employing G.8031 and CC messages, such as the network(s) disclosed herein, may improve reliability of network services. A dual homing protection of G.8031 network using VPLS enables a failover or failure recovery process to take place in case of nodal failures.

Figure 2:
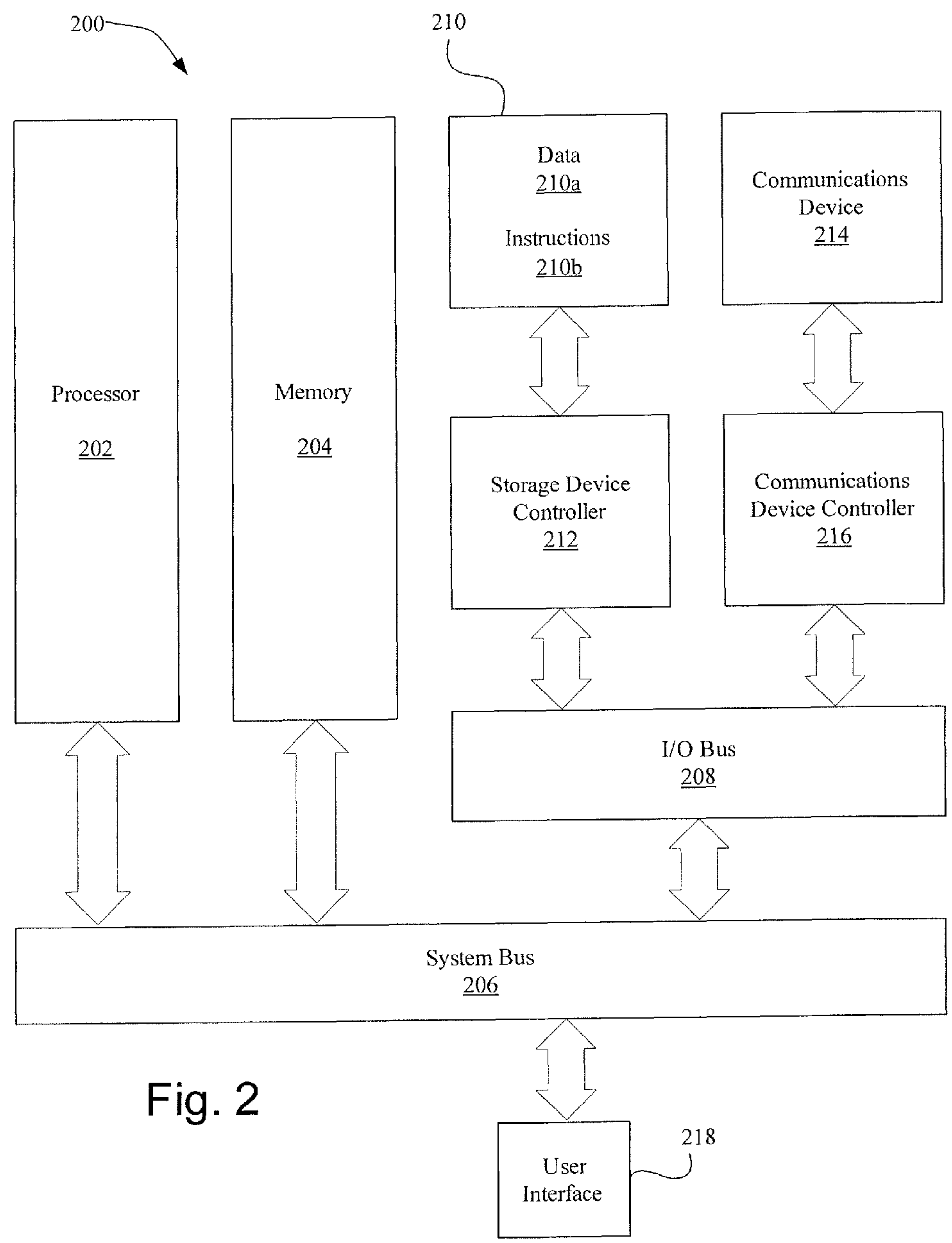
FIG. 2 is an architecture diagram of an exemplary processing system in accordance with an example embodiment herein.

Having described the exemplary network of FIG. 1, reference is now made to FIG. 2, which is an architecture diagram of an example data processing system 200, which in one example embodiment, can further represent, or be included in, a primary NE and/or a backup NE, and/or one or more of the other components 106, 108, 148, 102, 103, 110, 120, 124, 126, and 128 of FIG. 1. Data processing system 200 includes a processor 202 coupled to a memory 204 via system bus 206. Processor 202 is also coupled to external Input/Output (I/O) devices (not shown) via the system bus 206 and an I/O bus 208, and at least one input/output user interface 218. Processor 202 may be further coupled to a communications device 214 via a communications device controller 216 coupled to the I/O bus 208. Processor 202 uses the communications device(s) (e.g., 214) to communicate with other elements of a network, such as, for example, network nodes, and the communications devices may have one or more input and output ports. Processor 202 also can include an internal clock (not shown) to keep track of time, periodic time intervals, and the like.

A storage device 210 having a non-transitory computer-readable storage medium is coupled to the processor 202 via a storage device controller 212 and the I/O bus 208 and the system bus 206. The storage device 210 is used by the processor 202 and controller 212 to store and read/write data 210*a*, as well as computer program instructions 210*b*. In operation, processor 202 loads the program instructions 210*b* from the storage device 210 into the memory 204. Processor 202 then executes the loaded program instructions 210*b* to perform any of the example procedure(s) herein, for operating the system 200.

Figure 3:
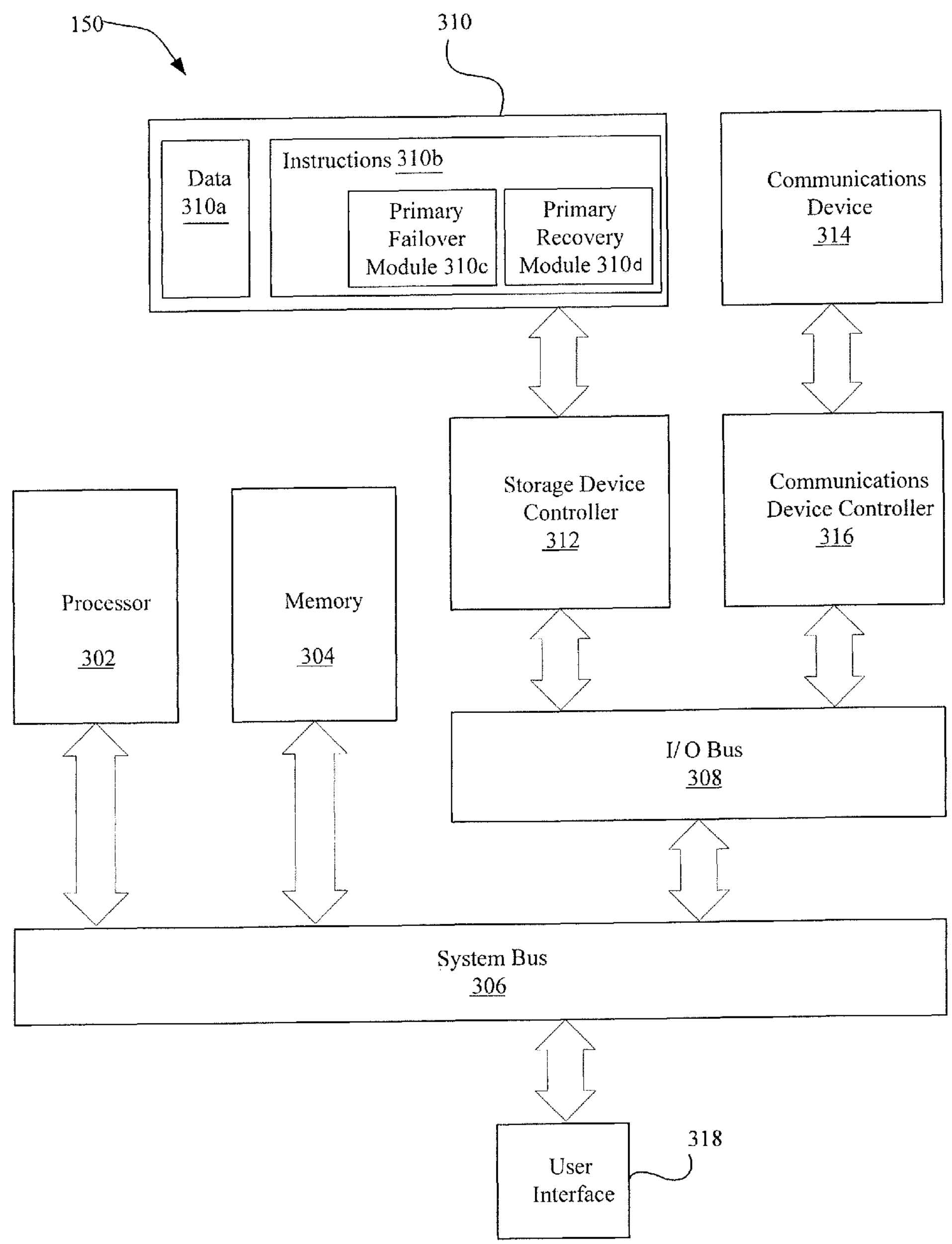
FIG. 3 is an architecture diagram of an exemplary primary router in accordance with an example embodiment herein.

Having described the example data processing system 200 of FIG. 2, reference is now made to FIG. 3, which is an architecture diagram of primary router 150. Primary router 150 includes a processor 302 coupled to a memory 304 via system bus 306. Processor 302 is also coupled to external Input/Output (I/O) devices (not shown) via the system bus 306 and an I/O bus 308, and at least one input/output user interface 318. Processor 302 uses the communications device(s) (e.g., 314) to communicate with other elements of a network, such as, for example, network nodes, and the communications devices may have one or more input and output ports. Processor 302 also can include an internal clock (not shown) to keep track of time, periodic time intervals, and the like.

A storage device 310 having a non-transitory computer-readable storage medium is coupled to the processor 302 via a storage device controller 312 and the I/O bus 308 and the system bus 306. The storage device 310 is used by the processor 302 and controller 312 to store and read/write data 310*a*, as well as computer program instructions 310*b* used to implement the procedure(s) described herein and shown in the accompanying drawing(s) herein, such as a procedure for controlling a primary NE to provide Ethernet fault protection. In operation, processor 302 loads the program instructions 310*b* from the storage device 310 into the memory 304. Processor 302 then executes the loaded program instructions 310*b* to perform any of the example procedure(s) described below, for operating the primary router 150.

In the example embodiment of FIG. 3, program instructions 310*b* include primary failover module 310*c* and primary recovery module 310*d*.

Primary failover module 310*c* includes program instructions for controlling primary router 150 to determine a link failure associated with primary link 142 for network communication between the primary router 150 and the head-end AS 148. AS 148 is configured for communication with backup router 152 via a secondary link 144 for network communication in a case of a failure of the primary link 142. Primary failover module 310*c* also includes program instructions for, in response to determination of a failure of the primary link 142, controlling the primary router 150 to send a switch-over notification message to the backup router 152 via the inter-chassis communication link 146 between the primary router 150 and the backup router 152. The switch-over notification message is a message for controlling the backup router 152 to establish communication with AS 148 via the secondary link 144 in the case of the failure of the primary link 142. The primary router 150 is configured to exchange status synchronization messages with AS 148 and the backup router 152 in accordance with a standardized Ethernet protection switching protocol. In the example embodiment, the standardized Ethernet protection switching protocol is the G.8031 Ethernet Protection Switching protocol under International Telecommunication Union ("ITU") standard for failover.

The primary router 150 is configured to exchange status synchronization messages with the backup router 152 via the inter-chassis communication link 146, and to exchange status synchronization messages with AS 148 through the inter-chassis communication link 146 and via the secondary link 144.

More precisely, primary router 150 exchanges information with backup router 152 via the inter-chassis communication link 146 in accordance with ICCP. Backup router 152 also exchanges G.8031 messages with AS 148 via secondary link (or path) 144. Information provided by primary router 150 via link 146 (using ICCP) may include, for example, status synchronization messages, switch-over notification messages, configuration information received by primary router 150, and network information detected by primary router 150. Information provided by backup router 152 via link 146 (using ICCP) may include, for example, status synchronization messages, configuration information received by backup router 152, network information detected by backup router 152, and information in G.8031 messages received by backup router 152 from AS 148. Backup router 152 provides information received from primary router 150 (via link 146 using ICCP) to AS 148 in at least one G.8031 message (via secondary link 144). Configuration information may include, for example, information configured by a user.

Primary recovery module 310*d* includes program instructions for controlling primary router 150 to, in response to reception of a recovery status synchronization message forwarded by the backup router 152 from AS 148, and indicating that the primary link 142 has recovered, send a media access control ("MAC") flush message to other network elements (e.g., 106 and 108 of FIG. 1) to flush all MAC addresses for the VLAN not learned from the primary router 150, and send the backup router 152 a status synchronization message indicating that the primary router 150 is enabled for communication with AS 148. The status synchronization message sent from the primary router 150 is forwarded by the backup router 152 to AS 148. The recovery status synchronization message is generated by AS 148 in response to detection that the primary link 142 has recovered.

Figure 4:
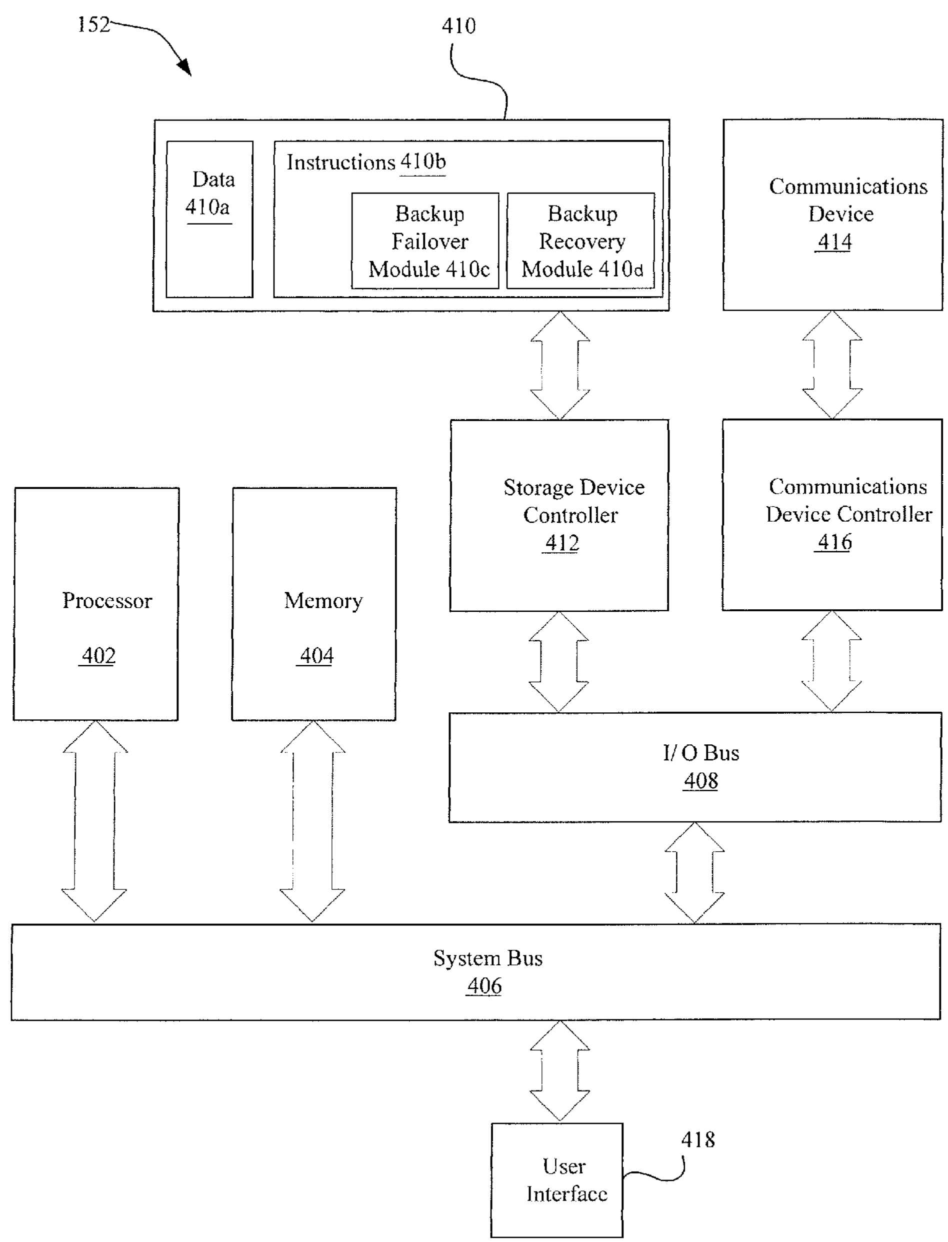
FIG. 4 is an architecture diagram of an exemplary backup router in accordance with an example embodiment herein.

Having described the example primary router 150 of FIG. 1 with respect to FIG. 3, reference is now made to FIG. 4, which is an architecture diagram of backup router 152. Backup router 152 includes a processor 402 coupled to a memory 404 via system bus 406. Processor 402 is also coupled to external Input/Output (I/O) devices (not shown) via the system bus 406 and an I/O bus 408, and at least one input/output user interface 418. Processor 402 may be further coupled to a communications device 414 via a communications device controller 416 coupled to the I/O bus 408. Processor 402 uses the communications device(s) (e.g., 414) to communicate with other elements of a network, such as, for example, network nodes, and the communications devices may have one or more input and output ports. Processor 402 also can include an internal clock (not shown) to keep track of time, periodic time intervals, and the like.

A storage device 410 having a non-transitory computer-readable storage medium is coupled to the processor 402 via a storage device controller 412 and the I/O bus 408 and the system bus 406. The storage device 410 is used by the processor 402 and controller 412 to store and read/write data 410*a*, as well as computer program instructions 410*b* used to implement the procedure(s) described herein and shown in the accompanying drawing(s) herein, such as a procedure for controlling a backup NE to provide Ethernet fault protection. In operation, processor 402 loads the program instructions 410*b* from the storage device 410 into the memory 404. Processor 402 then executes the loaded program instructions 410*b* to perform any of the example procedure(s) described herein, for operating the backup router 152.

In the example embodiment of FIG. 4, program instructions 410*b* include backup failover module 410*c* and backup recovery module 410*d*.

Backup failover module 410*c* includes program instructions for controlling backup router 152 to receive a switch-over notification message from a primary router 150 via the inter-chassis communication link 146 between the primary router 150 and the backup router 152. The switch-over notification indicates a failure of the primary link 142 for network communication between the primary router and the head-end AS 148. Backup failover module 410*c* also includes program instructions for controlling backup router 152 to, in response to reception of the switch-over notification message, send a status synchronization request to AS 148 to establish communication with AS 148 via the secondary link 144 for network communication between the backup router 152 and AS 148. The backup router 152 is configured to exchange status synchronization messages with the primary router 150 and AS 148, and in accordance with the standardized Ethernet protection switching protocol, via the inter-chassis communication link 146 and the secondary link 144, respectively, to forward status synchronization messages received from the primary router 150 to AS 148, and to forward status synchronization messages received from AS 148 to the primary router 150.

More precisely, primary router 150 exchanges information with backup router 152 via the inter-chassis communication link 146 in accordance with ICCP. Backup router 152 also exchanges G.8031 messages with AS 148 via secondary link (or path) 144. Information provided by primary router 150 via link 146 (using ICCP) may include, for example, status synchronization messages, switch-over notification messages, configuration information received by primary router 150, and network information detected by primary router 150. Information provided by backup router 152 via link 146 (using ICCP) may include, for example, status synchronization messages, configuration information received by backup router 152, network information detected by backup router 152, and information in G.8031 messages received by backup router 152 from AS 148. Backup router 152 provides information received from primary router 150 (via link 146 using ICCP) to AS 148 in at least one G.8031 message (via secondary link 144). Configuration information may include, for example, information configured by a user.

In the example embodiment of FIG. 4, backup failover module 410*c* further includes program instructions for controlling backup router 152 to, in response to reception of the switch-over notification message, send a media access control ("MAC") flush message to other network elements (e.g., 106 and 108 of FIG. 1) of the VLAN associated with the primary link 142 to flush all MAC addresses for the VLAN not learned from the backup router 152.

In the example embodiment, the standardized Ethernet protection switching protocol is the G.8031 Ethernet Protection Switching protocol under International Telecommunication Union ("ITU") standard for failover.

Backup recovery module 410*d* includes program instructions for controlling backup router 152 to, in response to reception of a recovery status synchronization message (from AS 148) indicating that the primary link 142 has recovered, forward the recovery status synchronization message to the primary router 150. Backup recovery module 410*d* also includes program instructions for controlling backup router 152 to, in response to reception of a status synchronization message from the primary router 150 indicating that the primary router 150 is enabled for communication with AS 148, forward the status synchronization message received from the primary router 150 to AS 148. The recovery status synchronization message is generated by AS 148 in response to detection that the primary link 142 has recovered. AS 148 activates the primary link between AS 148 and the primary router 150 in accordance with the standardized Ethernet protection switching protocol, in response to detection that the primary link 142 has recovered.

Figure 5A:
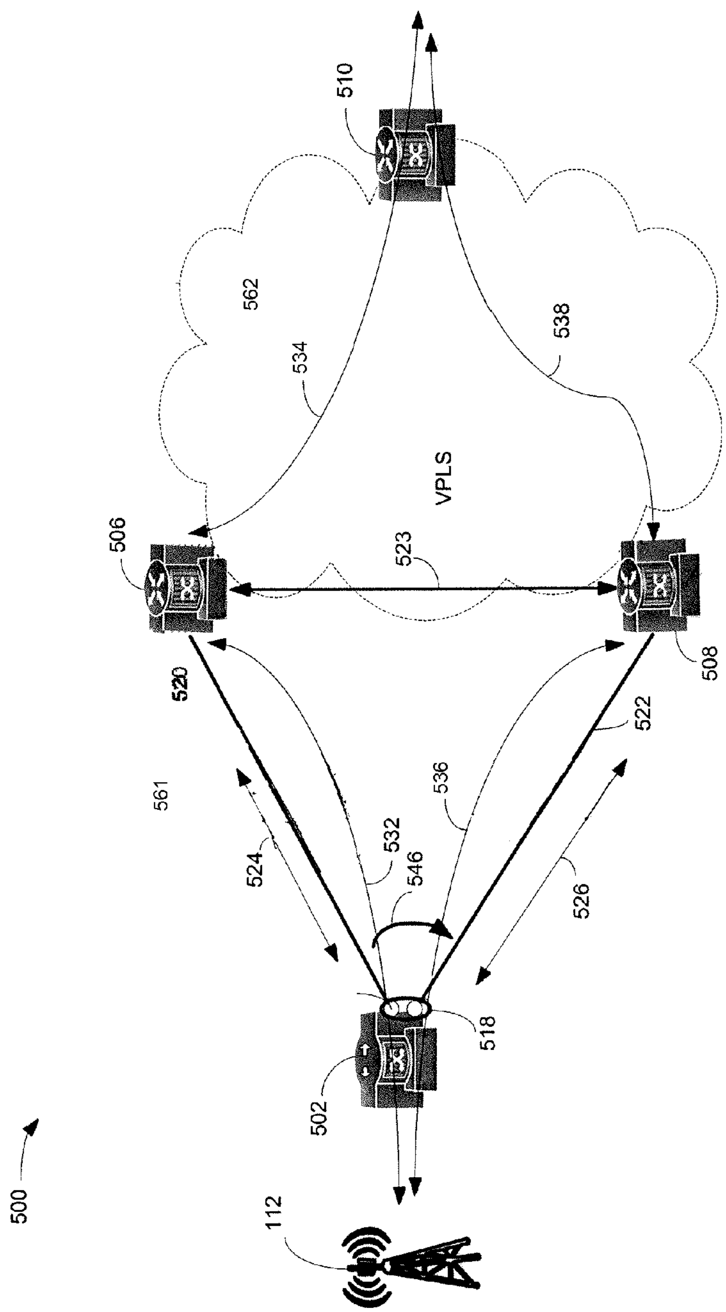
FIGS. 5A and 5B are block diagrams illustrating an exemplary computer network layout organized in a dual homing redundancy configuration capable of switching over to backup router(s) in accordance with an example embodiment herein.

Having described the example backup router 152 of FIG. 1 with respect to FIG. 4, reference is now made to FIG. 5A, which is a block diagram 500 illustrating an exemplary network layout organized in a dual homing redundancy configuration capable of failing over to a backup router(s) in accordance with one embodiment. Diagram 500 includes a NE 502, routers 506, 508 and 510, and links 520, 522 and 523. NE 502 is configured to communicate with other network devices, such as routers 506, 508 and a cell site, base station, or radio tower 112. NE 502, for example, may be a node, access switch (AS), router, hub, or a combination of routers, hubs, AS, and/or switches. In the example embodiment of FIGS. 5A and 5B, NE 502 is an AS, hereinafter referred to as AS 502.

To enhance data integrity as well as network reliability, the network layout shown in diagram 500 illustrates a dual homed redundancy network, also known as dual VLAN topology. In the example embodiment of FIGS. 5A and 5B, the dual homed or dual homing network configuration includes an AS 502, primary router 506, and backup router 508 wherein AS 502 is coupled to a first end of a primary link 520 and primary router 506 is coupled to a second end of primary link 520. AS 502, for example, verifies connectivity between AS 502 and primary router 506 via a connectivity verification protocol over primary link 520. The connectivity verification protocol, for example, may use CC messages under the IEEE 802.1ag standard, which hereinafter can also be referred to as 802.1ag CC messages. Primary router 506, on the other hand, is configured to communicate with AS 502 indirectly via backup router 508. More precisely, primary router 506 sends communications to backup router 508 via inter-chassis communication link 523 (in accordance with ICCP), and backup router 508 forwards these communications to AS 502 via the secondary link (in accordance with a standardized Ethernet protection switching protocol). Similarly, AS 502 sends communications to backup router 508 via the secondary link (in accordance with a standardized Ethernet protection switching protocol), and backup router 508 forwards these communications to primary router 506 via inter-chassis communication link 523 (in accordance with ICCP). The standardized Ethernet protection switching protocol provides for switching from a primary (or working) link to a secondary (or protection) link. In more detail, the Ethernet protection switching protocol defines messages for controlling a switch-over from the primary link to the secondary link, and for synchronizing status between NE's at either end of the secondary link. In the example embodiment of FIGS. 5A and 5B, the standardized Ethernet protection switching protocol is the G.8031 Ethernet Protection Switching protocol under International Telecommunication Union ("ITU") standard for failover, hereinafter referred to as G.8031.

Backup router 508 is coupled to AS 502 via a backup link 522 and is operable to provide a dual homed network redundancy between AS 502 and primary router 506 via the Ethernet protection switching protocol.

Figure 5B:
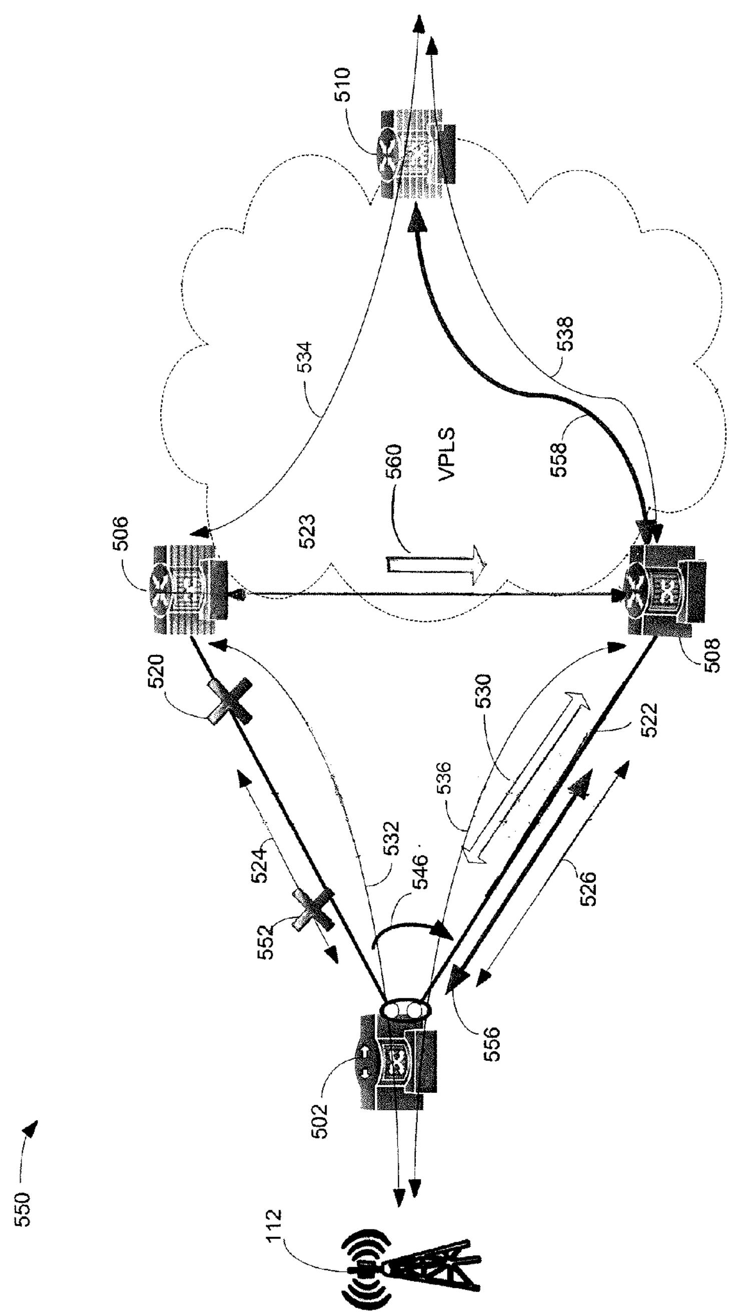

In the example embodiment of FIGS. 5A and 5B, primary link 520 and secondary link 522 are logical Virtual Local Area Network (VLAN) links of a Virtual Private Local Area Network Service (VPLS) network. In other embodiments, the primary link and the secondary link are logical links that are configured to support one or more of network services such as point-to-point, point-to-multipoint (bridging), multipoint-to-multipoint (IP) services, and the like, and/or that are configured to support applications, such as, for example, VLAN, IPTV, VoD, video conferencing, real time data, stock transactions, and the like.

AS 502 and routers 506 and 508 are structured in a dual homed redundancy network configuration wherein primary link 520 is used to connect AS 502 to primary router 506 and secondary link 522 is used to connect AS 502 to a backup router 508. Under normal conditions, AS 502 transmits data packets to and from primary router 506 via primary link 520. In the event that link 520 or primary router 506 fails, AS 502 switches its (logic) connection from primary router 506 to backup router 508 whereby AS 502 is able to continue providing network services/routing via a backup route. When primary router 506 recovers or restores from an earlier crash or failure, primary router 506, in the example embodiment, AS 502 detects that primary router 506 is ready to receive and route data again. To switch back (or revert) from backup router 508 to primary router 506, AS 502 begins a reversion process including activating a revert-timer requesting the backup router to close the backup router's port(s).

In the example embodiment of FIGS. 5A and 5B, AS 502 includes a G.8031 bundle 518, wherein bundle 518 further includes multiple G.8031 ports connected to multiple links for providing link protection or redundancy. AS 502 employs 802.1ag messages 524 and 526 to check connectivity over links 520 and 522 respectively. Link 520 is configured to facilitate transferring information including 802.1ag messages. Link 522 is configured to facilitate transferring information including 802.1ag messages and G.8031 messages.

Alternatively, link 522 may include multiple sub-links wherein some sub-links are dedicated to handle 802.1ag CC messages while other sub-links are dedicated to handle G.8031 messages.

Similarly, link 520 may include multiple sub-links wherein some sub-links are dedicated to handle 802.1ag CC messages.

As described above, in the embodiments of FIGS. 5A and 5B, CC messages in accordance with the 802.1ag standard are used to verify connectivity of links 520 and 522. However, in other embodiments, any other suitable protocol for verifying connectivity of a logical and/or physical link (e.g., primary link 520 and secondary link 522) may be used instead of IEEE 802.1ag.

During normal conditions, data streams or data packets 561, 562 (FIG. 5A) travel from radio tower 112 to router 510 via data paths 532 and 534 passing through AS 502 and primary router 506. In the example embodiment, primary link 520 is a primary VLAN, and backup link 522 is a backup VLAN.

In another embodiment, router 508 can be provisioned as a primary router and router 506 may be provisioned as a backup router. Alternatively, a backup router may be dedicated to backup more than one primary router, or vice versa.

Upon detecting a failure, a failover as indicated by arrow 546 will occur to switch from a working link 520 to a protected link 522. Primary router 506 and backup router 508, for example, are also interconnected by an inter-chassis communication link 523. The inter-chassis communication link 523 is similar to the inter-chassis communication link 146 described above with respect to FIG. 1.

In the example embodiment, both primary router 506 and AS 502 are configured to determine a link failure. Primary router 506 determines a link failure by at least one of detection of the link failure, reception of a connection defect message generated by the AS 502, or detection of a physical layer failure. In detecting the link failure, the primary router 506 performs the detection based on a message of continuity check in accordance with the IEEE 802.1ag standard for connectivity verification. AS 502 generates the connection defect message in response to detecting the link failure. AS 502 detects the link failure based on a message of continuity check in accordance with the IEEE 802.1ag standard for connectivity verification. As described above, in other embodiments, AS 502 and primary router 506 can use any other suitable protocol for verifying connectivity of a logical and/or physical link (e.g., primary link 520 and secondary link 522) instead of the IEEE 802.1ag standard for connectivity verification.

The dual homed network using G.8031 together with 802.1ag is useful because it can increase the speed of fail over between primary and backup routers so as to reduce an impact on normal network services and/or routing whereby packet loss or a black-holing scenario is minimized or reduced.

FIG. 5B is a block diagram 550 illustrating an exemplary computer network layout organized in a dual homed redundancy configuration capable of failing over to a backup router (s) in accordance with an example embodiment herein. Diagram 550, which is similar to diagram 500, includes an AS 502, routers 506, 508 and 510, and links 520 and 522 wherein links 520 and 522 are used to connect AS 502 and routers 506 and 508 in such a way that a dual homed network configuration is formed. Note that AS 502 and routers 506 and 508 can also be referred to as nodes 502, 506 and 508.

AS 502 includes input/output ("I/O") ports which are used to transmit and receive information between nodes 502, 506 and 508 via logical links 520 and 522. Logical links 520 and 522 are associated with physical connections such as, for example, Ethernet cables, USB (Universal Serial Bus) cables, phone lines, twisted pair cables, optical cables, and/or a combination of the above-mentioned connections.

In the example embodiment of FIGS. 5A and 5B, nodes 502, 506 and 508, are configured to employ connectivity fault management ("CFM") in accordance with a connectivity verification protocol, such as, for example IEEE 802.1ag. In other embodiments, nodes 502, 506 and 508 can use any other suitable protocol for verifying connectivity of a logical and/or physical link (e.g., primary link 520 and secondary link 522) instead of the IEEE 802.1ag standard for connectivity verification. IEEE 802.1ag defines a construct called an MEP, which is capable of sending periodic CC messages PDUs (protocol data units) and is capable of receiving CC message PDUs. The MEP at each node, which is also referred to as Down MEP, sends a CC message over a port of a node through a link to periodically verify the connectivity between the two nodes. Since Down MEP is able to send a message in a direction to a port, it is well suited to employ as a protocol entity to detect node connectivity at the link level. It should be noted that both Up MEP and Down MEP are capable of receiving the CC messages alike. Upon enabling of Down MEPs at nodes 502, 506 and 508, CC messages are periodically sent, monitored, and received for connectivity verification.

During an operation, when AS 502 detects a loss of CC message 552 over link 520, AS 502 sets RDI to one (1) (RDI=1) and sends a CC message with RDI=1 to primary router 506 indicating that link 520 is down. After receipt of the CC message with RDI status (RDI=1), primary router 506 sends a switch-over notification message 560 to the backup router 508 via the inter-chassis communication link 523 between the primary router 506 and the backup router 508. Alternatively, in response to detection by primary router 506 of a loss of CC message 552 over link 520, primary router 506 sends the switch-over notification message 560 to the backup router 508. The switch-over notification message is a message for controlling the backup router 508 to establish communication with AS 502 via the secondary link 522 in the case of the failure of the primary link 520. Meanwhile, AS 502 switches (or fails) over to protection path (or secondary link) 522 in accordance with the standardized Ethernet protection switching protocol described above.

In response to reception of the switch-over notification message 560 from primary router 506, backup router 508 sends a media access control ("MAC") flush message (not shown) to other network elements (e.g., 510) to flush all MAC addresses for the VLAN not learned from the backup router 508, opens its communication port by setting transmitting port to one (1) (Tx=1) indicating that it is ready to communicate with AS 502, and sends a G.8031 status synchronization message 530 to AS 502 to establish communication with AS 502 via the secondary link 522.

Upon receipt of the message 530 from backup router 508, AS 502 begins to transmit to or receive data packets 556, 558 from AS 502 and router 510 via data paths 536 and 538.

The dual homed network configuration using G.8031 and 802.1ag DOWN MEP over VPLS and MAC flush message mechanism is useful to reduce or minimize the time for switchover to a backup router, and packet losses. As described above, the MAC flush message is sent in accordance with IETF RFC 4762 ("Virtual Private LAN Service (VPLS) Using Label Distribution Protocol (LDP) Signaling"), available at http://tools.ietf.org/html/rfc4762, the contents of which is hereby incorporated by reference herein in its entirety, as if set forth fully herein.

Figure 6A:
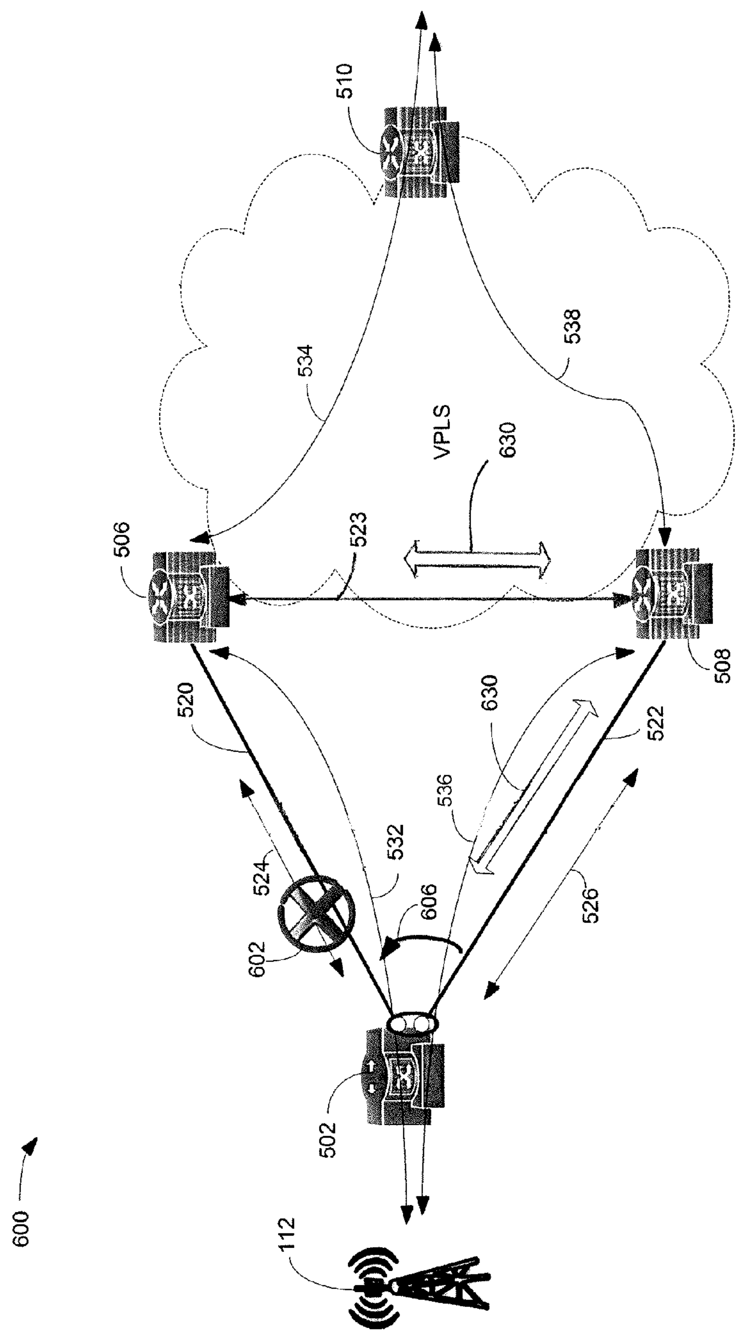
FIGS. 6A and 6B are block diagrams illustrating an exemplary computer network layout organized in a dual homing redundancy configuration capable of reverting back to primary router in accordance with an example embodiment herein.
Figure 6B:
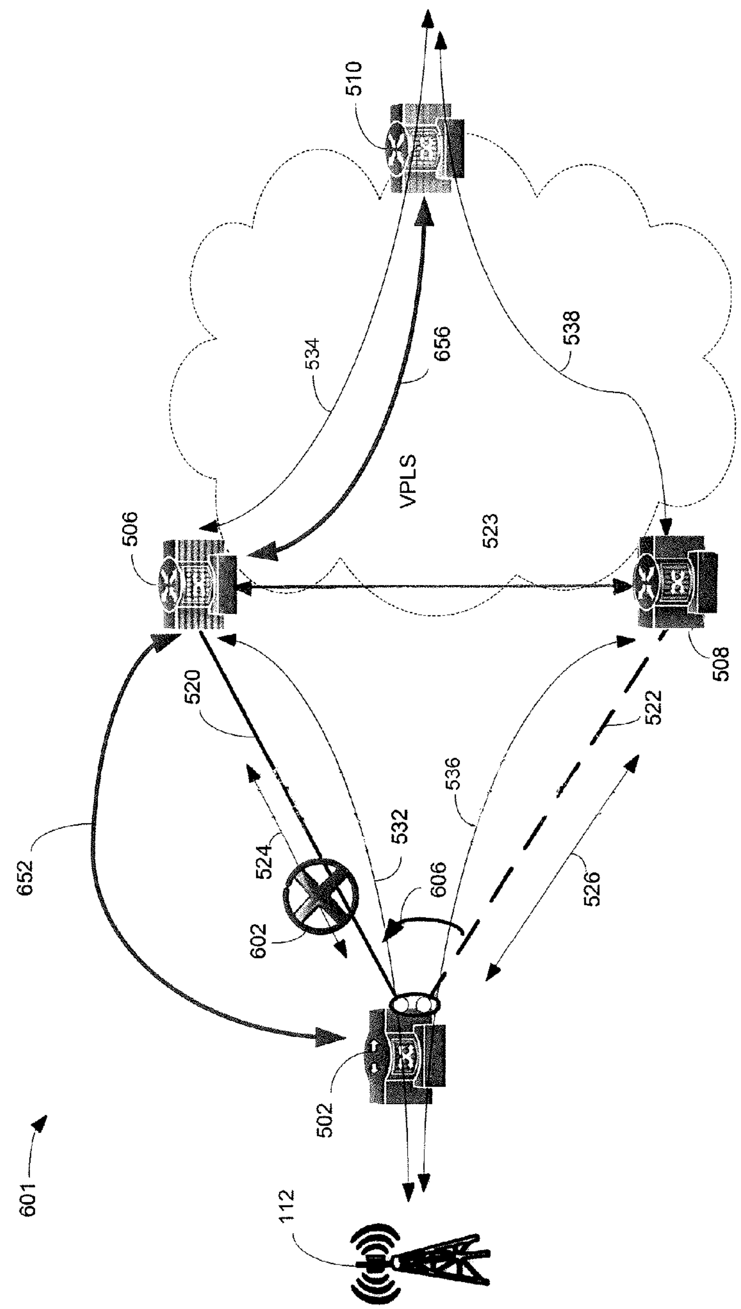

FIGS. 6A and 6B are block diagrams 600 and 601 illustrating an exemplary computer network layout organized in a dual homed redundancy configuration capable of reverting back to the primary router in accordance with an example embodiment herein. Diagram 600, which is similar to diagram 500, includes an AS 502, routers 506, 508, and 510, and links 520 and 522 wherein links 520 and 522 are used to connect AS 502 and routers 506 and 508 in such a way that a dual homed network configuration is formed.

The dual homed network shown in diagram 600 and 601 is in a reversion condition wherein backup router 508 is responsible for routing the traffic between AS 502 and router 510 via data paths 536 and 538 while primary router 506 is in a process of recovery from an earlier failure of the primary router 506 or primary link 520. Once primary router 506 is recovered or restored as indicated by numeral 602 (FIG. 6A) and is able to resume network service, primary router 506 reestablishes communication over link 520 between router 506 and AS 502. When AS 502 detects 802.1ag CC message 524 from primary router 506, AS 502 sends a 802.1ag CC message 524 providing resetting value of RDI (RDI=0) to primary router 506. Primary router 506 clears RDI condition(s) after it receives RDI=0 from AS 502. In response to detection of the 802.1ag CC message 524 from primary router 506, AS 502 starts the revert-timer and notifies backup router 508 that the revert-timer has been commenced, and backup link 522 will continue to serve or transfer data between AS 502 and router 510 until the revert-timer expires.

When the revert-timer expires, AS 502 switches back to G.8031 working path or primary link 520, as indicated by arrow 606, and instructs backup router 508 to close its communication port (Tx=0) by sending a recovery status synchronization message 630 in accordance with the G.8031 standard. Backup router 508 subsequently closes its communication port (Tx=0) and forwards the recovery status synchronization message 630 to the primary router 506 over 523.

In response to reception of a recovery status synchronization message 630 forwarded by the backup router 508 from AS 502, and indicating that the primary link 520 has recovered, the primary router 506 to sends a media access control ("MAC") flush message (not shown) to other network elements (e.g., 510) to flush all MAC addresses for the VLAN not learned from the primary router 506, and sends the backup router 508 a new status synchronization message 630 indicating that the primary router 506 is enabled for communication with AS 502. Backup router 508 forwards the new status synchronization message 630 sent from the primary router 506 to AS 502. Upon receipt of the new status synchronization message 630 sent from the primary router 506, AS 502 begins to facilitate transfer of data packets 652, 656 between AS 502 and router 510 via data paths 532 and 534.

The exemplary aspects herein involve procedures, which will be described below with respect to FIGS. 7 and 8. In one example embodiment herein, the procedures may be embodied in machine or computer executable instructions. The instructions can be used to cause a general purpose or special purpose system, which is programmed with the instructions to perform the procedures. Alternatively, the procedures of the example embodiments herein may be performed by specific hardware components that contain hard-wired logic for performing the procedures, or by any combination of programmed computer components and custom hardware components.

Figure 7:
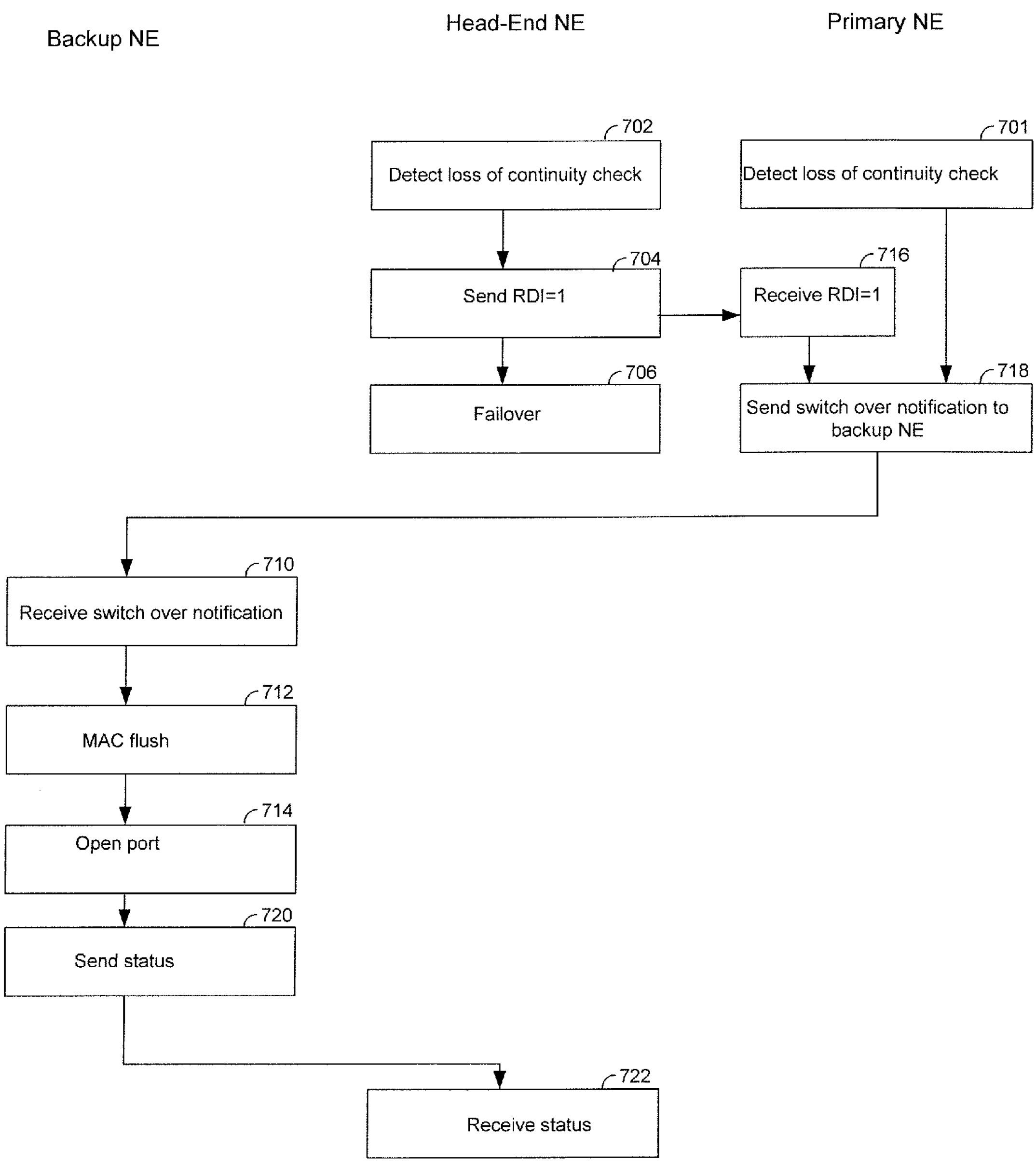
FIG. 7 is a flowchart illustrating an exemplary process of switching to a secondary path in a dual homed network configuration in accordance with an example embodiment herein.

FIG. 7 is a flowchart illustrating an example process of switching to a secondary path between a head-end NE and a backup NE, in a case of a failure of a primary path, so that communication is established between the head-end NE and the backup NE over the secondary path, in accordance with an example embodiment herein. At block 701, a primary network element ("NE") (e.g., primary router 150 of FIG. 1, primary router 506 of FIGS. 5A, 5B, 6A, 6B) determines a path failure (e.g., path 142 of FIG. 1, path 532 of FIGS. 5A, 5B, 6A, 6B) for network communication between the primary router and a head-end NE (e.g., AS 148 of FIG. 1, AS 502 of FIGS. 5A, 5B, 6A, 6B) based on detection of the failure in accordance with a connectivity verification protocol. In the embodiment of FIG. 7, the connectivity verification protocol is the IEEE 802.1ag standard. More precisely, the primary router determines the path failure of the primary path by detecting a loss of CC message over the primary path. However, in other embodiments, any other suitable protocol for verifying connectivity of a logical and/or physical path may be used instead of IEEE 802.1 ag.

At block 702, the head-end NE detects a path failure associated with the primary path in accordance with a connectivity verification protocol as described above with respect to block 701. At block 704, in response to detection of the path failure, the head-end NE sends a connection defect message to the primary NE. More precisely, in the embodiment of FIG. 7, the connection defect message is a CC message with RDI=1.

At block 706, the head-end NE fails over to a secondary path (e.g., path 144 of FIG. 1, path 536 of FIGS. 5A, 5B, 6A, 6B) in accordance with the standardized Ethernet protection switching protocol, which provides for switching from a primary (or working) path to a secondary (or protection) path. As described above, the Ethernet protection switching protocol defines messages for controlling a switch-over from the primary path to the secondary path, and for synchronizing status between NE's at either end of the secondary path. In the example embodiment of FIG. 7, the standardized Ethernet protection switching protocol is the G.8031 Ethernet Protection Switching protocol under International Telecommunication Union ("ITU") standard for failover.

In the example embodiment of FIG. 7, the primary path and the secondary path are logical Virtual Local Area Network (VLAN) links of a Virtual Private Local Area Network Service (VPLS) network. In other embodiments, the primary path and the secondary path are logical links that are configured to support one or more of network services such as point-to-point, point-to-multipoint (bridging), multipoint-to-multipoint (IP) services, and the like, and/or that are configured to support applications, such as, for example, VLAN, IPTV, VoD, video conferencing, real time data, stock transactions, and the like.

At block 716, the primary NE receives the connection defect message. At block 718, in response to detection of the path failure in block 701, or in response to receipt of the connection defect message in block 716, the primary NE sends a switch-over notification message to a backup NE (e.g., backup router 150 of FIG. 1, backup router 506 of FIGS. 5A, 5B, 6A, 6B) via an inter-chassis communication link (e.g., 146 of FIG. 1, 523 of FIGS. 5A, 5B, 6A, 6B) between the primary NE and the backup NE. The switch-over notification message is a message for controlling the backup NE to establish communication with the head-end NE via the secondary path. Communication over the inter-chassis communication link is performed in accordance with an inter-chassis communication protocol. In the example embodiment of FIG. 7, the inter-chassis communication protocol is the ICCP protocol, as described above.

At block 710, the backup NE receives the switch-over notification message from the primary NE via the inter-chassis communication link. At block 712, the backup NE sends a media access control ("MAC") flush message to other network elements (e.g., 106 and 108 of FIG. 1, 510 of FIGS. 5A, 5B, 6A, 6B) to flush all MAC addresses for the VLAN not learned from the backup NE. At block 714, the backup NE opens its communication port by setting transmitting port to one (1) (Tx=1). At block 720, the backup NE sends a status synchronization request in accordance with the G.8031 standard to the head-end NE to establish communication with the head-end NE. At block 722, the head-end NE receives the status synchronization request from the backup NE, and communication between the backup NE and the head-end NE over the secondary path is established.

Thus, in the manner described above for FIG. 7, communication is switched to a secondary path between the head-end NE and the backup NE, in a case of a failure of the primary path between the head-end NE and the primary NE.

Figure 8:
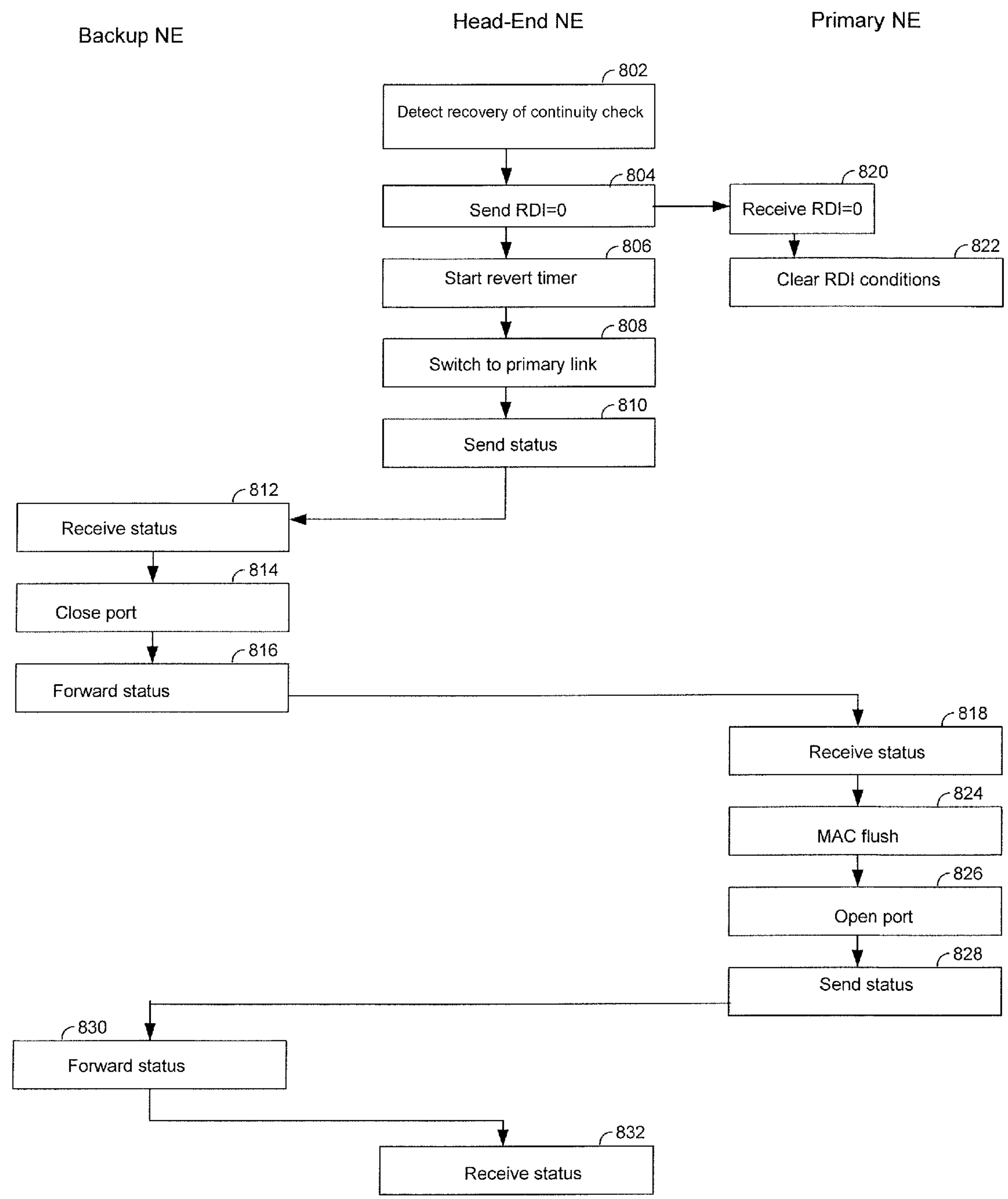
FIG. 8 is a flowchart illustrating an exemplary process of reversion to the primary path in accordance with an example embodiment herein.

FIG. 8 is a flowchart illustrating an example process of reversion to the primary path between the head-end NE and the primary NE, in a case of a recovery of the primary path between the head-end NE and the primary NE, so that communication is re-established between the head-end NE and the primary NE over the primary path, in accordance with one embodiment. At block 802, the head-end NE detects a path recovery associated with the primary path in accordance with the connectivity verification protocol. More precisely, in the example embodiment of FIG. 8, the head-end NE detects the recovery of the primary path in response to detection of a CC message from the primary NE. At block 804, in response to detection of the path recovery, the head-end NE sends a connection recovery message to the primary NE. More precisely, in the embodiment of FIG. 8, the connection recovery message is a CC message with RDI=0. At bock 820, the primary NE receives the CC message with RDI=0, and subsequently clears RDI condition(s) at block 822.

At block 806, the head-end NE starts a revert-timer and notifies the backup NE that the secondary path will continue to route the traffic until the revert-timer expires. At block 808 the revert-timer expires, and the head-end NE switches back to the primary path. At block 810, the head-end NE instructs the backup NE to close its communication port (Tx=0) by sending a recovery status synchronization message in accordance with the standardized Ethernet protection switching protocol. In the example embodiment of FIG. 8, the Ethernet protection switching protocol is the G.8031 standard.

At block 812, the backup NE receives the recovery status synchronization message, and then at block 814, the backup NE closes its communication port (Tx=0). At block 816, the backup NE forwards the recovery status synchronization message to the primary NE.

At block 818, the primary NE receives the recovery status synchronization message forwarded by the backup NE from the head-end NE via the inter-chassis communication link.

In the example embodiment of FIG. 8, the primary path and the secondary path are logical Virtual Local Area Network (VLAN) links of a Virtual Private Local Area Network Service (VPLS) network. In other embodiments, the primary path and the secondary path are logical links that are configured to support one or more of network services such as point-to-point, point-to-multipoint (bridging), multipoint-to-multipoint (IP) services, and the like, and/or that are configured to support applications, such as, for example, VLAN, IPTV, VoD, video conferencing, real time data, stock transactions, and the like.

At block 824, the primary NE sends a media access control ("MAC") flush message to other network elements (e.g., 106 and 108 of FIG. 1, 510 of FIGS. 5A, 5B, 6A, 6B) to flush all MAC addresses for the VLAN not learned from the primary NE. At block 826, the primary NE opens its communication port by setting transmitting port to one (1) (Tx=1), and at block 828, the primary NE sends the backup NE a status synchronization message indicating that the primary NE is enabled for communication with the head-end NE. The primary NE sends the status synchronization message via the inter-chassis communication link.

At block 830, the backup NE forwards the status synchronization message sent from the primary NE to the head-end NE, and at block 832, the head-end NE receives the status synchronization message generated by the primary NE, and communication is re-established between the head-end NE and the primary NE over the primary path.

Thus, in the manner described above for FIG. 8, communication is re-established over the primary path between the head-end NE and the primary NE, in a case of a recovery of the primary path between the head-end NE and the primary NE.

It should be noted that detection of a failure of a path herein may include not only detection of a failure of link(s), but also detection of failure of elements coupled in or to the path, such as, where applicable element 506 or 508.

While particular embodiments have been shown and described, it will be obvious to those of skills in the art that based upon the teachings herein, changes and modifications may be made without departing from this exemplary embodiments and its broader aspects. Therefore, the appended claims are intended to encompass within their scope all such changes and modifications as are within the true spirit and scope of this exemplary embodiments.

What is claimed is:

1. A procedure for operating a primary backup network element ("NE"), comprising:

receiving a switch-over notification message, indicating failure in a primary path, via an inter-chassis communication link;

providing a status synchronization message in accordance with a standardized protection switching protocol to a head-end NE to establish communication with the head-end NE via a secondary path;

forwarding a recovery status synchronization message to a primary NE, in response to reception of the recovery status synchronization message indicating that the primary path has recovered; and forwarding a further status synchronization message to the head-end NE, in response to reception of the further status synchronization message from the primary NE indicating that the primary NE is enabled.

2. The procedure of claim 1, wherein the primary path is a logical Virtual Local Area Network (VLAN) path of a Virtual Private Local Area Network Service (VPLS) network.

3. The procedure of claim 2, wherein the standardized protection switching protocol is the G.8031 Ethernet Protection Switching protocol under International Telecommunication Union ("ITU") standard for failover, and communication via the inter-chassis communication link is performed in accordance with the Internet Engineering Task Force (IETF) Inter-Chassis Communication Protocol (ICCP).

4. The procedure of claim 2, further comprising, in response to receipt of the switch-over notification message, providing at least one of a media access control ("MAC") flush message and a status synchronization message indicating that the backup NE is enabled.

5. The procedure of claim 1, wherein the primary path is enabled in accordance with the standardized protection switching protocol.

6. A backup network element ("NE") comprising:

at least one computer-readable memory configured to store program instructions; and at least one processor operating under control of the program instructions to receive a switch-over notification message, indicating failure in a primary path, via an inter-chassis communication link, and provide a status synchronization message in accordance with a standardized protection switching protocol to a head-end NE to establish communication with the head-end NE via a secondary path, wherein the at least one processor also operates under control of the program instructions to forward a recovery status synchronization message to a primary NE, in response to reception of the recovery status synchronization message indicating that a primary path has recovered, and forward a further status synchronization message to the head-end NE, in response to reception of the further status synchronization message from the primary NE indicating that the primary NE is enabled.

7. The backup network element of claim 6, wherein the primary path is a logical Virtual Local Area Network (VLAN) path of a Virtual Private Local Area Network Service (VPLS) network.

8. The backup network element of claim 7, wherein the standardized protection switching protocol is the G.8031 Ethernet Protection Switching protocol under International Telecommunication Union ("ITU") standard for failover, and communication via the inter-chassis communication link is performed in accordance with the Internet Engineering Task Force (IETF) Inter-Chassis Communication Protocol (ICCP).

9. The backup network element of claim 8, wherein communicating via the inter-chassis communication link in accordance with ICCP includes communication of at least one of configuration information, network information, and information in G.8031 messages.

10. The backup network element of claim 9, wherein the at least one processor also operates under control of the program instructions to provide information, received via the inter-chassis communication link, to the head-end NE in at least one G.8031 message; and provide, via the inter-chassis communication link, information in G.8031 messages received from the head-end NE.

* * * * *